Patented July 6, 1954

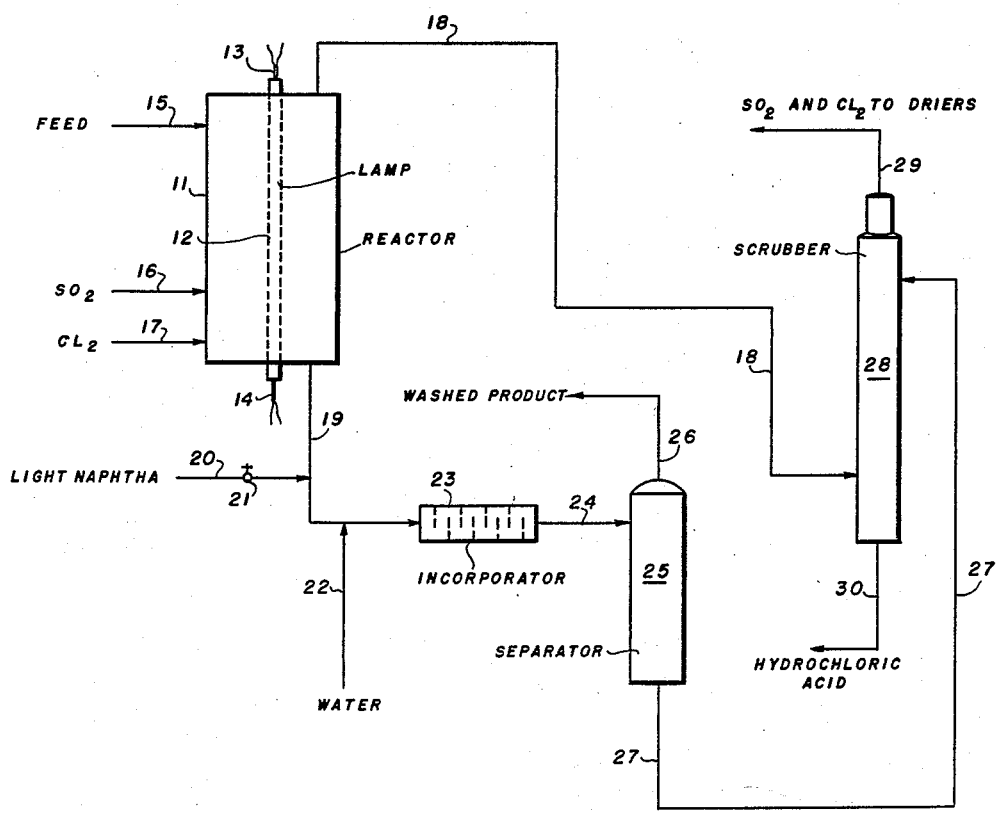

2,683,076

UNITED STATES PATENT OFFICE 2,683,076

RECOVERY OF GASES IN THE SULFOCHLORINATION OF HYDROCARBONS

Harry E. Cier and Henry G. Schutze, Baytown, Tex., assignors, by mesne assignments, to Standard Oil Development Company, Elizabeth, N. J., a corporation of Delaware Application November 20, 1952, Serial No. 321,664

1 Claim. (Cl. 23—154)

The present invention is directed to the recovery of gases produced in the sulfo-chlorination of hydrocarbons. More particularly, the invention is directed to the recovery of sulfur dioxide and chlorine as well as hydrogen chloride from the products of a sulfo-chlorination reaction. In its more specific aspects, the invention resides in the removal of hydrogen chloride from the products of a sulfo-chlorination reaction.

The present invention may be briefly described as a method of recovering sulfur dioxide, chlorine and hydrogen chloride from a hydrocarbon sulfonyl chloride product containing same and from a gaseous mixture of sulfur dioxide, chlorine and hydrogen chloride produced in the formation of said sulfonyl chloride, the particular feature of the invention involving admixing or contacting said product with a sufficient amount of water under conditions to remove from said product said sulfur dioxide, chlorine and hydrogen chloride and to form an aqueous solution of hydrochloric acid and then scrubbing the gaseous mixture with said aqueous solution under conditions to recover hydrogen chloride from said gaseous mixture and to remove said sulfur dioxide and chlorine from said aqueous solution. The hydrochloric acid solution and sulfur dioxide and chlorine are then separately recovered.

It is known that hydrocarbon sulfonyl chlorides may be synthesized by the photochemical reaction of hydrocarbons, sulfur dioxide and chlorine. The present invention involves an improvement in the process in which the gases from the photochemical reaction are recovered as useful products and made available for re-use in the process and for use in other commercial outlets.

In the sulfo-chlorination reaction a suitable hydrocarbon in the liquid phase or a solution of a hydrocarbon in a solvent, such as carbon tetrachloride and the like, is irradiated in the presence of sulfur dioxide and chlorine. This reaction may be conducted in either a batch or continuous fashion. Usually to obtain the maximum amount of sulfonyl chloride and the minimum amount of organic chlorides, which are formed as a by-product of the process, the molar ratio of sulfur dioxide to chlorine in the feed gases exceeds unity. Thus the spent gas from the photochemical reaction usually will be comprised of large amounts of hydrogen chloride produced in the reaction and the unconsumed sulfur dioxide and a minor amount of chlorine. The sulfur dioxide, chlorine and hydrogen chloride are discharged from the photochemical reaction in solution with the liquid product and as a gaseous mixture. It is exceedingly desirable to collect these materials in both streams, separate the hydrogen chloride from the sulfur dioxide and chlorine, return the sulfur dioxide and chlorine to the reactor with the fresh hydrocarbon feed and recover the hydrogen chloride and hydrochloric acid as a by-product.

In accordance with the present invention these objects are accomplished by washing or contacting the product containing the dissolved gases mentioned before with water to remove the dissolved gases and to form an aqueous solution of hydrochloric acid. The aqueous solution is then employed to contact the gaseous admixture of sulfur dioxide, chlorine and hydrogen chloride under countercurrent conditions to recover the hydrogen chloride and to remove from the aqueous solution the sulfur dioxide and chlorine.

In a specific example of the present invention a hydrocarbon feed, such as a lubricating oil fraction, is pumped continuously into a suitable reactor containing a satisfactory source of actinic radiation, and is intimately contacted with sulfur dioxide and chlorine. An appropriate drawoff is provided whereby the hydrocarbon-hydrocarbon sulfonyl chloride is continuously withdrawn. This liquid reactor product will contain dissolved sulfur dioxide, chlorine and hydrogen chloride. The amounts of the various gases dissolved will depend upon a number of factors such as reactor temperature and pressure, total feed composition, conversion level, etc. This liquid product, containing dissolved gases, is water washed either as it is or, if desired, after blending with a light diluent such as hexane or heptane to lower the viscosity of the reactor product. The quantity of water employed will be preferably related to the amount of hydrogen chloride synthesized in the photochemical reactor; the preferred amount of water is that quantity which will just dissolve the total hydrogen chloride formed to give a solution of hydrochloric acid of the desired strength. For example, assume that it is desired to recover an 18° Bé. hydrochloric acid as a by-product from the sulfochlorination of a hydrocarbon. Such an acid will contain about 28% hydrogen chloride and 72% water. Therefore, for every 28 pounds of hydrogen chloride synthesized in the photoreactor a total of 72 pounds of water will be applied to wash the hydrocarbon-hydrocarbon sulfonyl chloride mixture which discharges from the reactor. This liquid reactor product, of course, will only contain a fraction of the total gaseous product issuing from the reactor; the balance will be collected as a vapor.

Of the gases dissolved in the liquid product from the reactor, sulfur dioxide will be the major component. Consequently the water separating from the water washing operation will contain primarily sulfur dioxide with relatively small amounts of hydrogen chloride and chlorine. This acidic water will then be introduced into the top of a scrubbing tower and the vapors from the photoreactor will be introduced into the bottom of the scrubber. In this countercurrent scrubbing the hydrogen chloride will be preferentially dissolved and will tend to "salt out" the sulfur dioxide and chlorine. The aqueous layer will be withdrawn from the bottom of the scrubber and sent to storage as the desired by-product, hydrochloric acid. This hydrochloric acid will contain only a very small quantity of sulfur dioxide and chlorine which can be reduced still further by air blowing at elevated temperatures.

The undissolved gases issuing from the scrubber will consist primarily of sulfur dioxide with some chlorine and a very small amount of hydrogen chloride. Since these gases will be moist, they may be passed through a drier, compressed and returned to the feed system of the photochemical reactor. The small amount of hydrogen chloride being recycled to the system will not be detrimental.

In the discussion of the process above, an arbitrary example was selected in which it was stated that 72 pounds of water be employed to wash the oil with and subsequently scrub the reactor vapor to recover a total of 28 pounds of hydrogen chloride. This should be understood to be the idealized case and that in some instances it will be necessary to use more water for washing the oil than required for the production of the desired strength of by-product hydrochloric acid.

In such a case, the water (which may be applied in several washes rather than one) which is in excess of that required for the desired by-product acid concentrate may be discarded.

The scrubbing operation may be conducted in equipment available for contacting gases with liquids. Particularly apparatus for adsorption of hydrogen chloride should be satisfactory in the practice of the present invention. Such equipment has been described by Oldershaw et al. in Chemical Engineering Progress 1947, vol. 43, pg. 371.

The present invention will be further illustrated by reference to the drawing in which the single figure is a flow diagram of a preferred mode.

Referring now to the drawing numeral 11 designates a photochemical reactor in which is arranged an elongated lamp 12 provided with electrical conducting leads 13 and 14 which may be connected to a suitable source of electrical energy. The lamp 12 provides a source of actinic light which may be a mercury vapor lamp. The reactor 11 has a feed line 15 through which a suitable hydrocarbon feed such as a lubricating oil fraction, a petroleum wax fraction, or lighter petroleum fractions including pentane may be introduced. For example, the feed may be a fraction boiling in the range from about 100° up through and including the lubricating oil boiling range. The feed may be suitably diluted with a chlorinated solvent, such as carbon tetrachloride. The reactor 11 is also provided with lines 16 and 17 through which may be introduced sulfur dioxide and chlorine, respectively. On contact of the feed hydrocarbon with the sulfur dioxide and chlorine in the presence of light, a hydrocarbon sulfonyl chloride product is formed in the reactor 11, the gases bubbling up through a pool or body of feed maintained in the reactor 11.

Issuing from the top of the reactor 11 is a gaseous mixture containing unreacted sulfur dioxide and chlorine and hydrogen chloride produced in the process. This gaseous mixture is discharged from reactor 11 by line 18 for further treatment and recovery of the gases as will be described hereinafter.

The hydrocarbon sulfonyl chloride product issues from reactor 11 by way of line 19. This product contains unreacted hydrocarbon, sulfur dioxide and chlorine and hydrogen chloride dissolved therein. In the feed stock is a high boiling hydrocarbon or if the conversion has been allowed to proceed to high levels, the product issuing from reactor 11 by line 19 may be quite viscous in nature and it may be desirable to dilute the product by introducing into line 19 by line 20 controlled by valve 21 a light hydrocarbon, such as a light naphtha, which suitably may be heptane or hexane or may be the feed stock when a light hydrocarbon is used. For example, if heptane is reacted, the light naphtha may be heptane.

In any event, the introduction of a light naphtha diluent will depend on the viscosity of the product issuing by way of line 19 from reactor 11 and in some instances may not be required. Be that as it may, the product flowing through line 19 has admixed with it a sufficient amount of water introduced by line 22. This amount of water should be a sufficient amount to dissolve the hydrogen chloride in the product in line 19 and to recover the hydrogen chloride in the gaseous mixture in line 18 as will be described. The water in admixture with the product flows into an incorporator or suitable mixing device 23 where it is intimately admixed and agitated. This incorporator 23 may be any suitable mixing device, such as a centrifugal pump, a contacting tower, a baffle plate incorporator as illustrated, or any of the numerous mixing devices, such as those provided with an agitator or impeller available on the market. The admixture of water and product is discharged from the incorporator 23 by line 24 and is introduced thereby into a separator 25 which is of suitable capacity to provide a residence time for separation between the washed product and the aqueous medium which is now a solution of hydrochloric acid containing the dissolved hydrogen chloride, sulfur dioxide and chlorine which was originally dissolved in the product of line 19. The washed product is recovered from separator 25 by line 26 and may be further treated such as neutralized with an alkali metal hydroxide and the like to form the corresponding sulfonates.

The aqueous solution of hydrochloric acid is withdrawn from separator 25 by line 27 and is introduced thereby into a scrubbing tower 28 which may be provided with suitable internal contacting equipment to allow intimate contact between liquids and gases. The gases in line 18 are introduced at a lower end of scrubber 28 and the aqueous hydrochloric acid and the gaseous mixture are contacted countercurrently in the scrubber 28 under conditions such that the hydrogen chloride in the gaseous mixture is removed from the gaseous mixture and the sulfur dioxide and chlorine in the hydrochloric acid are removed therefrom thereby allowing the discharge from the top of scrubber 28 by line 29 of a gaseous mixture of sulfur dioxide and chlorine. Since this gaseous mixture contains moisture, it should be routed to a suitable drier and then may be compressed after drying and used in the reactor 11. This mixture of sulfur dioxide and chlorine may be introduced into reactor 11 by either line 16 or line 17.

The aqueous hydrochloric acid, which is produced in the process and which contains substantially all the hydrogen chloride produced in the photochemical reaction, is withdrawn from scrubber 28 by line 30 for use as may be desired. Suitably the hydrochloric acid may be concentrated and used as commercial hydrochloric acid.

It will be seen from the foregoing description taken with the drawing that we both remove the dissolved gases from the sulfonyl chloride product and recover the valuable gases from the gaseous mixture leaving the photochemical reactor, producing nothing but valuable products in the process.

While the amount of water employed will usually be the amount stated before, it may be desirable to use an amount of water in the range from 0.75 pound to 2.0 pounds per pound of chlorine charged to the reactor 11.

The temperature employed in the photochemical reactor 11 may range from 75° to 225° F. When employing a lubricating oil fraction as a feed a temperature of about 150° F. may be used. Pressures may vary from approximately atmospheric up to about 150 pounds per square inch.

The conditions in separator 25 and scrubber 28 will ordinarily encompass atmospheric temperatures and pressures; however, pressures and temperatures may be adjusted to allow best recovery of the desirable products. For example it may be desirable to operate separator 25 or scrubber 28 at temperatures up to 225° F. or higher.

The nature and objects of the present invention having been completely described and illustrated, what we wish to claim as new and useful and to secure by Letters Patent is:

In a method for producing a sulfonyl chloride product including the steps of reacting a hydrocarbon in a reactive zone with sulfur dioxide and chlorine to produce a hydrocarbon sulfonyl chloride product, withdrawing a liquid fraction consisting of hydrocarbon sulfonyl chloride and dissolved sulfur dioxide, chlorine, and hydrogen chloride and a gaseous mixture of sulfur dioxide, chlorine, and hydrogen chloride, admixing said liquid fraction with water under conditions to remove from said liquid product said dissolved sulful dioxide, chlorine and hydrogen chloride and to form an aqueous solution of hydrochloric acid containing said sulfur dioxide, and hydrogen chloride originally dissolved in said liquid fraction, separating hydrocarbon sulfonyl chloride product from said aqueous solution and then scrubbing said gaseous mixture with said aqueous solution in a gas washer under conditions to recover hydrogen chloride from said gaseous mixture and to permit the escape from the gas washer of the sulfur dioxide and chlorine present and continuously returning the sulfur dioxide and chlorine from the gas washer to the reaction zone.

References Cited in the file of this patent

UNITED STATES PATENTS

| Number | Name | Date |
|---|---|---|
| 1,781,830 | Barstow | Nov. 18, 1930 |
| 2,165,784 | Burrage | July 11, 1939 |
| 2,174,509 | Fox | Sept. 26, 1939 |
| 2,228,598 | Fox | Jan. 14, 1941 |
| 2,265,163 | Herold | Dec. 9, 1941 |
| 2,301,779 | Herold | Nov. 10, 1942 |
| 2,416,467 | Carney | Feb. 25, 1947 |
| 2,542,961 | Johnson et al. | Feb. 20, 1951 |